United States Patent
Bertosh et al.

(10) Patent No.: US 9,537,583 B2
(45) Date of Patent: *Jan. 3, 2017

(54) METHOD, CONTROLLER, AND SYSTEM FOR TUNNEL COMMUNICATION

(71) Applicants: Michael W. Bertosh, Bethel Park, PA (US); Michael Berube, Marietta, GA (US)

(72) Inventors: Michael W. Bertosh, Bethel Park, PA (US); Michael Berube, Marietta, GA (US)

(73) Assignee: Strata Products Worldwide, LLC, Sandy Springs, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,979

(22) Filed: Aug. 14, 2015

(65) Prior Publication Data
US 2016/0028494 A1 Jan. 28, 2016

Related U.S. Application Data

(62) Division of application No. 13/743,947, filed on Jan. 17, 2013, now Pat. No. 9,118,409.

(51) Int. Cl.
| H04B 13/02 | (2006.01) |
| H04B 1/02 | (2006.01) |
| H04L 12/707 | (2013.01) |
| H04W 4/22 | (2009.01) |
| H04W 40/22 | (2009.01) |

(52) U.S. Cl.
CPC ............... *H04B 13/02* (2013.01); *H04L 45/22* (2013.01); *H04W 4/22* (2013.01); *H04W 40/22* (2013.01)

(58) Field of Classification Search
CPC ...................................................... H04B 13/02
See application file for complete search history.

(56) References Cited

U.S. PATENT DOCUMENTS

| 2003/0107511 A1* | 6/2003 | Stolarczyk | F41H 11/12 342/22 |
| 2006/0291378 A1* | 12/2006 | Brotherston | H04L 12/2854 370/221 |
| 2007/0249319 A1* | 10/2007 | Faulkner | H04L 1/22 455/402 |

(Continued)

*Primary Examiner* — Cindy Trandai
(74) *Attorney, Agent, or Firm* — Ansel M. Schwartz

(57) ABSTRACT

A communication system for allowing personnel in a tunnel below ground to communicate with a location above ground includes a controller disposed below ground in the tunnel. The system includes an uplink portion that sends uplink messages from the controller below ground in the tunnel through earth to above ground. The system includes a downlink portion through which downlink messages are sent from above ground through earth to the controller below ground in the tunnel. The system includes a personnel communication portion through which downlink messages are sent from the controller wirelessly to the personnel as personnel messages and personnel messages are received wirelessly by the controller from the personnel below ground in the tunnel. A controller for allowing personnel in a tunnel below ground to communicate with a location above ground. A method for allowing personnel in a tunnel below ground to communicate with a location above ground.

21 Claims, 3 Drawing Sheets

(56) References Cited

U.S. PATENT DOCUMENTS

| | | | |
|---|---|---|---|
| 2008/0137589 A1* | 6/2008 | Barrett | H04M 3/42348 370/327 |
| 2010/0248615 A1* | 9/2010 | Oguchi | H04B 7/2606 455/7 |
| 2011/0251968 A1* | 10/2011 | Parker | G06Q 30/018 705/317 |
| 2011/0309931 A1* | 12/2011 | Rose | E21F 17/18 340/539.13 |
| 2013/0196593 A1* | 8/2013 | Roper | H04B 13/02 455/40 |

* cited by examiner

METHOD, CONTROLLER, AND SYSTEM FOR TUNNEL COMMUNICATION

CROSS-REFERENCE TO RELATED APPLICATIONS

This is a divisional application of U.S. patent application Ser. No. 13/743,947 filed Jan. 17, 2013, now U.S. Pat. No. 9,118,409, incorporated by reference herein.

FIELD OF THE INVENTION

The present invention is related to a communication system for allowing personnel in a mine, tunnel or other space below ground to communicate with a location above ground. (As used herein, references to the "present invention" or "invention" relate to exemplary embodiments and not necessarily to every embodiment encompassed by the appended claims.) More specifically, the present invention is related to a communication system for allowing personnel below ground to communicate with a location above ground that includes a controller which controls message flow between the personnel below ground and above ground.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In mines, it is imperative that communication exists between the miners that are in the mine below ground and to people above ground. Specifically, in emergency situations, it is critical to be able to communicate with the miners to know whether they have been injured, where they are located, whether they are trapped, and whether they need food, water, air or first aid, to name but a few of the possible needs of the miners in such situations.

The problem that exists with communication in a mine is that the earth itself can impede communication between the miners in the mine as well as between the miners in the mine and people above the ground. Cabling or wiring has traditionally been used, but it requires a connection between the communication points. If the communication points are separated by a significant distance, it becomes problematic to extend the wiring such distances. Moreover, since mines are constantly expanding and changing shape, wiring is constantly being run to accommodate the changing distances and configurations of the mine. In addition, mines are hazardous places, with rockfall possibly damaging or cutting wires, which could be very dangerous in emergency situations where the communication is badly needed. Furthermore, it is impractical to extend wires to each miner in a mine to be able to communicate with each miner at any time. Although the specific need that gave rise to the invention was first identified in the mining industry, the utility of the invention could apply equally to emergency situations involving personnel in an underground work location, such as tunnels.

Wireless communication would eliminate the problems associated with using cabling or wiring for communication in a mine, but the very earth itself imposes difficulties on wireless communication between miners in the mine, and miners in the mine and people above ground.

BRIEF SUMMARY OF THE INVENTION

The present invention pertains to a communication system for allowing personnel in a tunnel below ground to communicate with a location above ground. The system comprises a controller disposed below ground in the mine. The system comprises an uplink portion that sends uplink messages from the controller below ground in the tunnel through the earth to above ground. The controller is in communication with the uplink portion. The system comprises a downlink portion through which downlink messages are sent from above ground through earth to the controller below ground in the tunnel. The controller is in communication with the downlink portion. The system comprises a personnel communication portion through which downlink messages are sent from the controller wirelessly to the personnel as personnel messages and personnel messages are received wirelessly by the controller from the personnel below ground in the tunnel. The controller is in communication with the personnel communication portion.

The present invention pertains to a method for allowing personnel in a tunnel below ground to communicate with a location above ground. The method comprises the steps of sending uplink messages from a controller through an uplink portion below ground in the tunnel through earth to above ground. The controller in communication with the uplink portion. There is the step of sending messages from above ground through earth to the controller through a downlink portion below ground in the tunnel, the controller in communication with the downlink portion. There is the step of sending from the controller through a personnel communication portion wirelessly to the personnel downlink messages as personnel messages. The controller in communication with the personnel communication portion. There is the step of receiving wirelessly by the controller from the personnel below ground in the tunnel personnel messages.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 2:
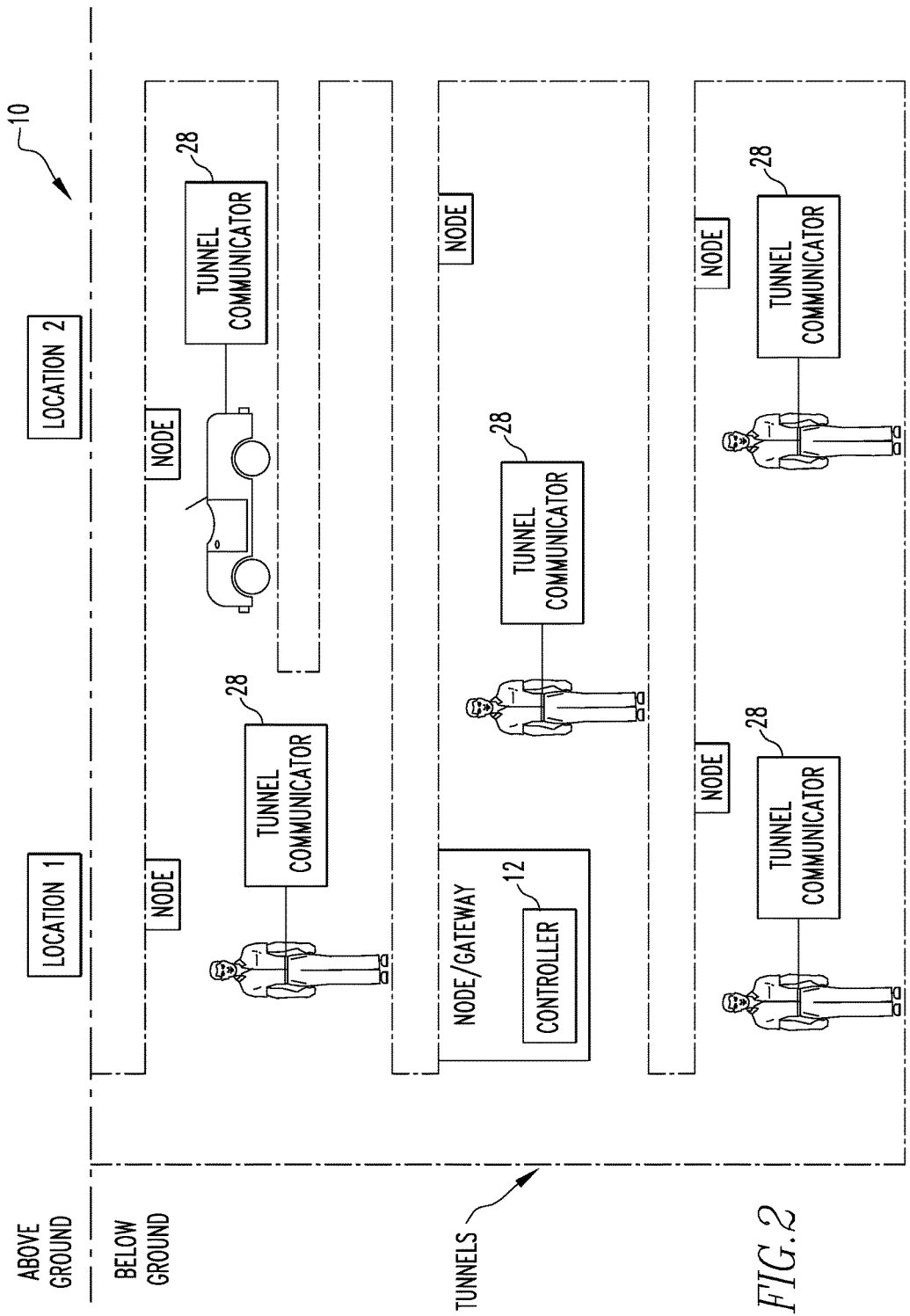
FIG. 2 is a schematic representation of the system of the present invention.
Figure 3:
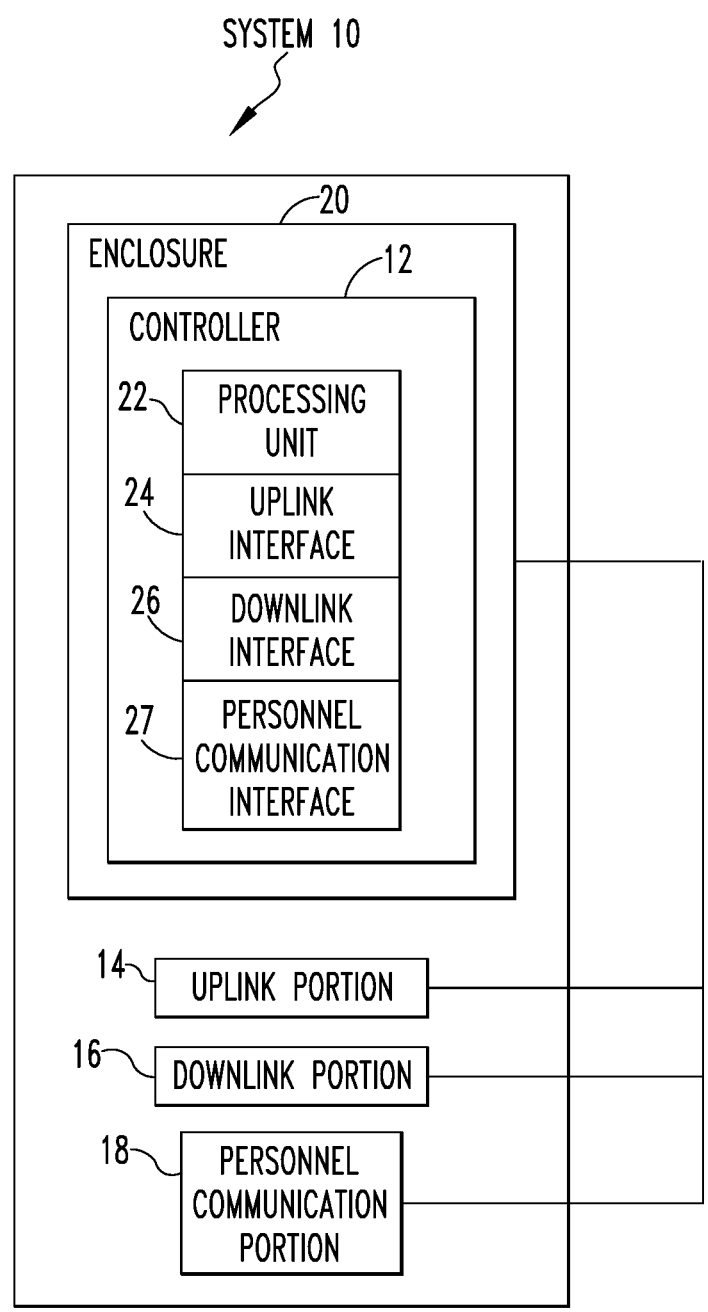
FIG. 3 is a block diagram of the system of the present invention.

Referring now to the drawings wherein like reference numerals refer to similar or identical parts throughout the several views, and more specifically to FIGS. 1 and 2 and 3 thereof, there is shown a communication system 10 for allowing personnel, such as miners, in a tunnel, for instance in a mine, below ground to communicate with a location above ground. The system 10 comprises a controller 12 disposed below ground in the tunnel. The system 10 comprises an uplink portion 14 that sends uplink messages from the controller 12 below ground in the tunnel through earth to above ground. The controller 12 in communication with the uplink portion 14. The system 10 comprises a downlink portion 16 through which downlink messages are sent from above ground through earth to the controller 12 below ground in the tunnel. The controller 12 in communication with the downlink portion 16 of the system 10 comprises a personnel communication portion 18 through which downlink messages are sent from the controller 12 wirelessly to the personnel as personnel messages and personnel messages are received wirelessly by the controller 12 from the personnel below ground in the tunnel, the controller 12 in communication with the personnel communication portion 18.

The controller 12 may be disposed in an intrinsically safe enclosure, such as an explosion proof enclosure 20. The controller 12 may include a processing unit 22 which takes downlink messages received from the downlink portion 16 and transmits the downlink messages as personnel messages to the personnel, and which takes personnel messages received from the personnel communication portion 18 and transmits the personnel messages as uplink messages above ground through the uplink portion 14. The controller 12 may include an uplink interface 24 through which uplink messages are provided to the uplink portion 14, a downlink interface 26 through which downlink messages are received from the downlink portion 16, and a personnel communication interface through which personnel messages are sent to and received from the personnel communication portion 18.

The processing unit 22 may broadcast out the downlink messages as personnel messages to all personnel through the personnel communication portion 18. The personnel communication portion 18 may include a personnel communicator 28 disposed with each personnel that sends a response to each personnel message received from the controller 12 back to the controller 12 through the personnel communication portion 18. The response may be either positive or negative, for instance red or green, respectively, and the processing unit 22 counts the responses that are green which were received over a predetermined time period and sends an uplink message at a frequency which corresponds to a number of responses counted in the predetermined time that are green which were received by the controller 12.

The downlink portion 16 may use magnetic induction to send the above ground message to the tunnel. The uplink portion 14 may use seismic waves to send the below ground message to above ground. The system 10 may include a battery and the controller 12 includes a relay bank which prevents electrical feedback from the battery to the controller 12.

The present invention pertains to a controller 12 for allowing personnel in a tunnel below ground to communicate with a location above ground. The controller 12 comprises an uplink interface 24 through which uplink messages are sent to the location above ground. The controller 12 comprises a downlink interface 26 through which downlink messages are received from above ground. The controller 12 comprises a personnel communication interface through which personnel messages are sent to and received from the personnel below ground in the tunnel. The controller 12 comprises a processing unit 22 which takes downlink messages received from the downlink interface 26 and transmits the downlink messages as personnel messages to the personnel through the personnel communication interface, and which takes personnel messages received from the personnel communication interface and transmits the personnel messages as uplink messages above ground through the uplink interface 24.

The present invention pertains to a method for allowing personnel in a tunnel below ground to communicate with a location above ground. The method comprises the steps of sending uplink messages from a controller 12 through an uplink portion 14 below ground in the tunnel through earth to above ground. The controller 12 is in communication with the uplink portion 14. There is the step of sending messages from above ground through earth to the controller 12 through a downlink portion 16 below ground in the tunnel, the controller 12 in communication with the downlink portion 16. There is the step of sending from the controller 12 through a personnel communication portion 18 wirelessly to the personnel downlink messages as personnel messages. The controller 12 is in communication with the personnel communication portion 18. There is the step of receiving wirelessly by the controller 12 from the personnel below ground in the tunnel personnel messages.

There may be the steps of a processing unit 22 of the controller 12 taking downlink messages received from the downlink portion 16 and transmitting the downlink messages as personnel messages to the miners, and taking personnel messages received from the personnel communication portion 18 and transmitting the personnel messages as uplink messages above ground through the uplink portion 14. There may be the steps of the controller 12 providing uplink messages to the uplink portion 14 through an uplink interface 24 of the controller 12, providing downlink messages received from the downlink portion 16 to the processing unit 22 through a downlink interface 26 of the controller 12, sending personnel messages to the personnel from the processing unit 22 through a personnel communication interface of the controller 12; and receiving personnel messages from the personnel by the processing unit 22 through the personnel communication portion 18.

There may be the step of the processing unit 22 broadcasting out the downlink messages as personnel messages to all personnel through the personnel communication portion 18. The personnel communication portion 18 may include a personnel communicator 28 disposed with each personnel and including the step of sending from the personnel communicators 28 a response to each personnel message received from the controller 12 back to the controller 12 through the personnel communication portion 18. The response may be either red or green, and there may be the steps of the processing unit 22 counting the responses that are green which were received over a predetermined time period and sending an uplink message at a frequency which corresponds to a number of responses counted in the predetermined time that are green which were receives by the controller 12. There may be the step of preventing electrical feedback from a battery to external power with a relay bank of the controller 12.

Figure 1:
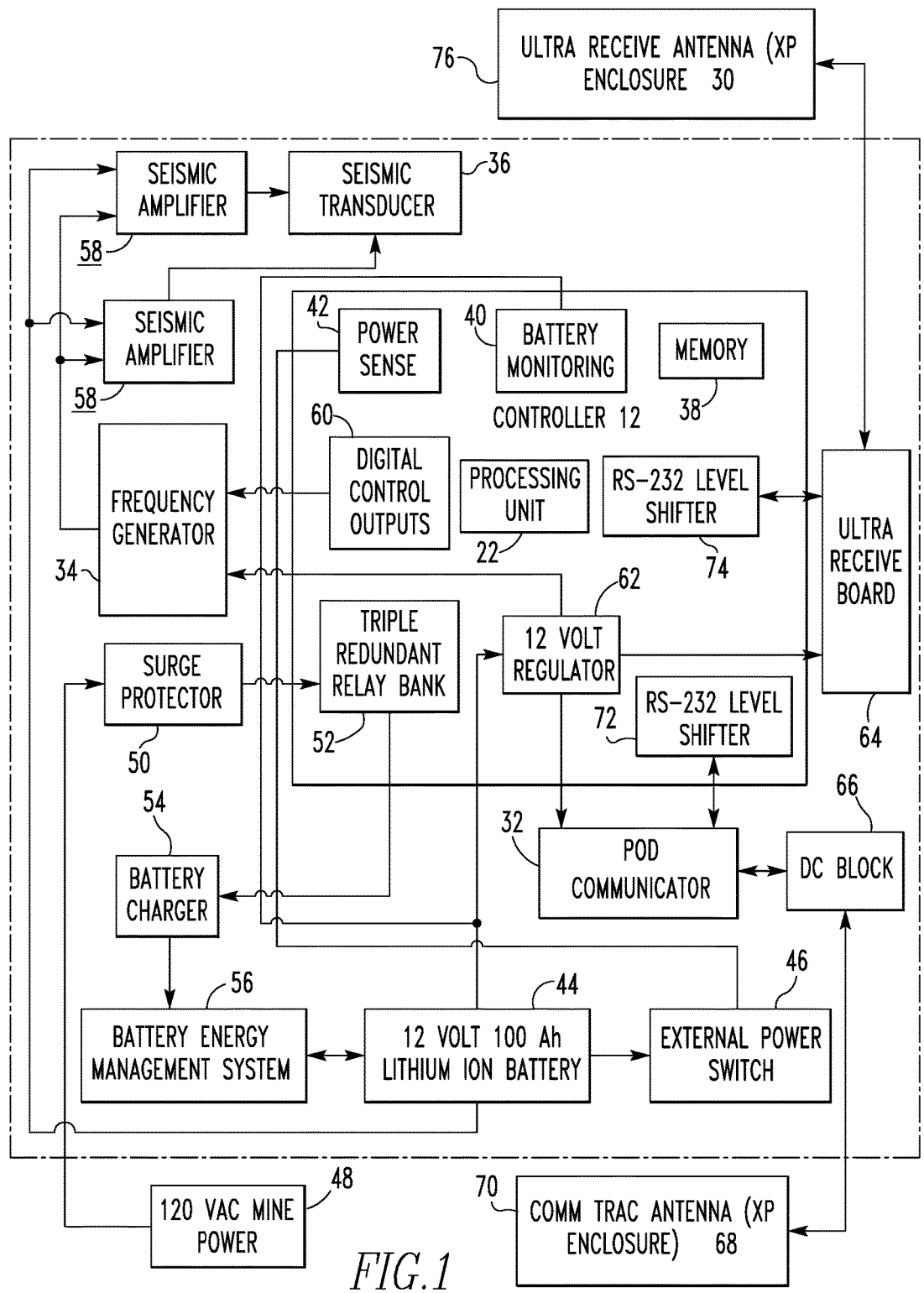
FIG. 1 is a block diagram of the system of the present invention.

Referring to FIG. 1, the controller 12 consists of three main communication interfaces. The first, the downlink interface 26, is an RS-232 serial connection to the RX downlink equipment/antenna 30. When a message is sent from the surface, it is received through the RX downlink equipment/antenna 30 and transmitted to a processing unit 22 of the controller 12 through this RS-232 connection. The message type transmitted is a text message. This message is then sent to the POD Communicator 32 (CommTrac Interface) also through an RS-232 connection. From here the message is broadcast out to all of the miners on their Miner Communicator 28. Each miner will generate a response to this text message (green or red) that will be received through the POD Communicator 32 and sent back to the through the RS-232 connection. The processing unit 22 will then accumulate the number of green responses over a 2 minute period. It will then turn-on and control the frequency generator 34 which generates a frequency that will be received on the surface (uplink). The processing unit 22 will set the digital outputs that correspond to one of the twenty desired frequencies. Each frequency corresponds to the number of green responses. For example, 0-3 green responses are 1 frequency and 4-6 green responses are a second frequency.

The green and red response is utilized for a yes/no to answer a question sent to a miner. For example, the message "Are you hurt?" might be sent to the miner from the surface. When received by the miner he will either press green for yes or red for no. These responses are sent back to the processing unit 12 using CommTrac. The data is then accumulated using the microcontroller and the number of yes responses is sent to the surface using a corresponding frequency. The specific frequency/tone is sent using the uplink seismic transducer 36 (the subwoofer).

Uplink Data is sent as a frequency or tone. This tone corresponds to some known canned data. Downlink data is sent as ASCII text. This downlink data is then converted to a CommTrac text message. Downlink text messages are converted to Miner Terminated Text Messages to be sent over the personnel communication portion 18, which is preferably a CommTrac network. Miners will then respond with the Miner Terminated Text/Configuration Acknowledgement Message. These responses are the green/red responses that are accumulated in the non-transient memory 36 of the controller 12 and mapped to a frequency to be sent to the surface above ground. Commtrac, which provides communication between the miners in the tunnel and the controller 12, is well known in the art and may be purchased from Strata Products Worldwide, LLC in Sandy Springs, Ga.

Other functions the controller 12 provides are battery monitoring 40 and power sense 42. It is connected to the battery 44 and a message is sent through the CommTrac network every 30 minutes to the controller 12 providing battery health information. It also is constantly monitoring a switch 46 to determine if power is present. This allows the controller 12 to know when to operate.

In regard to FIG. 1, the 120 VAC mine power 48 is a source of electricity for the system 10 from the mine. Electricity is fed to a surge protector 50 and then to a triple redundant relay bank 52 of the controller 12. The triple redundant relay bank 52 prevents electrical feedback from the batteries 44 to the equipment in the event that electricity from the mine is turned off or terminated, for example in a disaster event, so electrical feedback to the equipment will not cause a dangerous condition and potentially trigger an explosion in the mine.

The part numbers for the EMS system, battery, and surge protector are, respectively:

Elite Power Systems EMS-4-V2
Elite Power Systems GBS-LFMP100AH
Sola-HD STFE050-10N Electricity from the triple redundant relay bank 52 is then fed to a battery charger 54, and from the battery charger 54 fed to a battery energy management system 56. The battery energy management system 56 monitors and controls electricity to the batteries 44 and protects the batteries 44. The battery energy management system 56 will turn off electricity to the batteries 44 in the event that electricity is too low or too high, either of which could result in damage to the batteries 44. The battery energy management system 56 basically load balances the battery discharge and the charging of the batteries 44. Electricity from the battery energy management system 56 is provided to the batteries 44, here, preferably 12 V 100 aH lithium ion batteries 44. The batteries 44 are connected to the external power switch 46 which turns on and off the system 10.

The batteries 44 are electrically connected to two seismic amplifiers 58 which are in turn connected to a seismic transducer 36 to produce a vibrating signal that is transmitted to the surface for communication with the surface. Also connected to the seismic amplifiers 58 is the frequency generator 34 that receives input from the digital control outputs 60 of the controller 12 and controls the vibration signal that is ultimately transmitted by the seismic transducer 36. See U.S. Pat. No. 7,843,768, incorporated by reference herein, for details of the operation of the transmission signal to the surface from the system 10.

The controller 12 also has a power sense 42 connected to the electrical power switch 46 to determine when the system 10 is activated. The controller 12 also has battery monitoring 40 connected to the batteries 44 to monitor the charge of the batteries 44. The batteries 44 are also connected to a 12 volt regulator 62 of the controller 12. The 12 volt regulator 62 is electrically connected to the frequency generator 34 and to a POD communicator 32 and to a downlink receiver 64 to power them. The POD communicator 32 in turn is connected to a DC block 66, which in turn is connected to the Commtrac antenna 68 in a first explosion proof enclosure 70 to power the Commtrac antenna 68. In addition, a first RSS 232 level shifter 72 is in communication with the POD communicator 32 through which messages are sent to and received from the Commtrac antenna 68 in regard to communication with the miners. It should be noted that Commtrac is an example of a mesh network generally that can be used with the present invention.

A second RS-232 level shifter 74 of the controller 12 is in communication with the Ultra Receive Antenna 30 in a second explosion proof enclosure 76 through which messages are received from the surface. The downlink portion where signals are transmitted from the surface to the Ultra Receive antenna 30 and the Ultra Receive board 64 was purchased from Ultra Electronics Maritime Systems, Inc. in Nova Scotia, Canada.

Each explosion proof container is attached to the controller 12 through an MSHA approved cable. This cabling is required by MSHA for intrinsic safety reasons and is well known in the art.

As mentioned above, CommTrac is a well-known stand-alone communications and tracking system that operates by having nodes that are positioned ideally on the ceiling of a mine. These nodes form a self-healing wireless network that is used as a backbone for transmitting data to the surface. Data is received by each node and is transmitted to the next "hop" or node until it reaches the surface. The nodes are organized in a tree structure so each node knows exactly what node it must send data to in order for it to reach the surface. Each node positioned on the ceiling will send a status update once every 5 minutes to report battery life and the state of the network as that node sees it. The miners carry personal devices, otherwise called here personnel communicators 28 that transmit their location once per second by receiving the signal strength of all the nodes around them. This data is sent to the surface where their position is determined by having the server run an algorithm. The server can determine the location because it knows the geographical location of every node in the network. The miner's personal communicator 28 can also send text messages through this network as well as receive them.

When the system 10 is activated by the switch 46, then the node having the controller 12 turns into the Gateway of the CommTrac network or the root of the tree. This root is normally on the surface, but since that communication is assumed to be cut-off, the node with the controller 12 will become this Gateway. All data will flow to the controller 12 of the system 10, but it will essentially only care about responses to the questions asked from the surface. When a message is sent from the surface, it is sent through the downlink portion 16 of the system 10 to the controller 12, and then out the CommTrac network and downstream through the network until it reaches all of the miners. This is when each miner will respond with the 1, 2, or 3 colors. These messages are received by the Gateway and passed to the controller 12 just as they would in a surface server. But now the controller 12 filters for the responses and accumulates them. Once all of the responses are received, a frequency/tone that corresponds to a number of responses is sent to the surface by the controller 12.

Before the switch 46 is thrown, the CommTrac node that would become the Gateway is only used to relay data to the surface Gateway and operates like any other node of the CommTrac network. It will not pass any data it receives to the controller 12 in the system 10. After the switch 46 is thrown, this node becomes the Gateway (endpoint for the data) so the CommTrac network will reconfigure itself to relay all data to the new Gateway. Once the CommTrac node that has now become the gateway in the system 10 receives any data, it will be passed to the controller 12 in the system 10. When the switch 46 is thrown, the controller 12 will re-program the CommTrac node parameters to tell it to become a gateway for the CommTrac network.

The switch 46 may be a lever physically located on the explosion proof enclosure 20, also called the Through the Earth (TTE) box. Until that switch 46 is thrown, the CommTrac node used in the system 10 just acts like any other node in the CommTrac network. Once the switch 46 is activated, then this node converts itself to a CommTrac gateway that causes the other underground nodes to reconfigure to send data to it. By the switch 46 being thrown indicates the CommTrac underground network has lost communication with the surface or doesn't exist. Miners would typically only want to use the system 10 if they had too because CommTrac communication had been destroyed.

In reconfiguration, the following occurs. The nodes are always searching for a parent to connect to and send data. This parent is decided by selecting the least number of hops to the root of the tree (the Gateway). Once the node with the controller 12 becomes the root/Gateway, all of the nodes will automatically reconfigure to send data to it because it will now be broadcasting in its beacon that it has the least number of hops.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A communication system for allowing personnel in a tunnel below ground to communicate with a location above ground comprising:
    a controller disposed below ground in the tunnel;
    an uplink portion that sends uplink messages from the controller below ground in the tunnel through earth to above ground, the controller in communication with the uplink portion;
    a downlink portion through which downlink messages are sent from above ground through earth to the controller below ground in the tunnel, the controller in communication with the downlink portion; and
    a personnel communication portion through which downlink messages are sent from the controller wirelessly to the personnel as personnel messages, and personnel messages, are received wirelessly by the controller from the personnel below ground in the tunnel, the controller in communication with the personnel communication portion, the personnel communication portion having a plurality of nodes in the tunnel and a surface gateway above ground in communication with each other, the personnel communication portion in communication with above ground separately from the uplink portion and the downlink portion, one node of the plurality of nodes having a switch which converts the one node to a new gateway node for the plurality of nodes when the personnel communication portion loses communication with above ground and the surface gateway and causes other nodes of the plurality of nodes to reconfigure and send data to the new gateway node, the one node having the controller, after the switch is activated, the one node becomes the new gateway node, as the new gateway node it becomes an endpoint for the data, once the one node has become the new gateway node, any data the new gateway node receives is passed to the controller and the controller transmits the data to above ground through the uplink portion in the uplink messages, and once the one node has become the new gateway node, the new gateway node receives downlink messages from above ground through the downlink portion, the controller includes a processing unit which, once the one node has become the new gateway node, takes downlink messages received from the downlink portion and transmits the downlink messages as personnel messages to the personnel, and which takes personnel messages received from the personnel communication portion and transmits the personnel messages as uplink messages above ground through the uplink portion.

2. The system as described in claim 1 wherein the controller is disposed in an intrinsically safe enclosure.

3. The system as described in claim 2 wherein the enclosure is explosion proof.

4. The system as described in claim 3 wherein the controller includes a processing unit which takes downlink messages received from the downlink portion and transmits the downlink messages as personnel messages to the personnel, and which takes personnel messages received from the personnel communication portion and transmits the personnel messages as uplink messages above ground through the uplink portion.

5. The system as described in claim 4 wherein the controller includes an uplink interface through which uplink messages are provided to the uplink portion, a downlink interface through which downlink messages are received from the downlink portion, and a personnel communication interface through which personnel messages are sent to and received from the personnel communication portion.

6. The system of claim 5 wherein the processing unit broadcasts out the downlink messages as personnel messages to all personnel through the personnel communication portion.

7. The system of claim 6 wherein the personnel communication portion includes a personnel communicator disposed with each personnel that sends a response to each personnel message received from the controller back to the controller through the personnel communication portion.

8. The system of claim 7 wherein the response is either positive or negative and the processing unit counts the responses that are positive which were received over a predetermined time period and sends an uplink message at a frequency which corresponds to a number of responses counted in the predetermined time that are positive which were received by the controller.

9. The system of claim 8 wherein positive responses are green responses and negative responses are red responses.

10. The system of claim 9 wherein the downlink portion uses magnetic induction to send the above ground message to the tunnel.

11. The system of claim 10 wherein the uplink portion uses seismic waves to send the below ground message to above ground.

12. The system of claim 11 including a battery and the controller includes a relay bank which prevents electrical feedback from the battery to external tunnel power.

13. A controller for allowing miners in a tunnel below ground to communicate with a location above ground comprising: an uplink interface with an uplink portion through which uplink messages are sent to the location above ground; a downlink interface with a downlink portion through which downlink messages are received from above ground; a personnel communication interface with a personnel communication portion through which personnel messages are sent to and received from the personnel below ground in the tunnel;
a switch which converts the controller to a new gateway node for a plurality of nodes when the personnel communication portion loses communication with above ground and the surface gateway and causes other nodes of the plurality of nodes to reconfigure and send data to the new gateway node, after the switch is activated, the controller becomes the new gateway node, as the new gateway node it becomes an endpoint for the data, once the controller has become the new gateway node, any data the new gateway node receives transmits the data to above ground through the uplink portion in the uplink messages, and once the controller has become the new gateway node, the new gateway receives downlink messages from above ground through the downlink portion; and
a processing unit which, once the controller has become the new gateway node, takes downlink messages received from the downlink portion and transmits the downlink messages as personnel messages to the personnel, and which takes personnel messages received from the personnel communication portion and transmits the personnel messages as uplink messages above ground through the uplink portion.

14. A method for allowing personnel in a tunnel below ground to communicate with a location above ground comprising the steps of:
a personnel communication portion having a plurality of nodes in the tunnel and a surface gateway above ground in communication with each other, the personnel communication portion in communication with above ground separately from an uplink portion and a downlink portion, one node of the plurality of nodes having a switch, the switch converting the one node to a new gateway node for the plurality of nodes when the personnel communication portion loses communication with above ground and the surface gateway and causes other nodes of the plurality of nodes to reconfigure and send data to the new gateway node, the one node having a controller, after the switch is activated, the one node becomes the new gateway node, as the new gateway node it becomes an endpoint for the data, once the one node has become the new gateway node, any data the new gateway node receives is passed to the controller and the controller transmits the data to above ground through the uplink portion in the uplink messages, and once the one node has become the new gateway node, the new gateway node receives downlink messages from above ground through the downlink portion, the controller includes a processing unit which, once the one node has become the new gateway, takes downlink messages received from the downlink portion and transmits the downlink messages as personnel messages to the personnel, and which takes personnel messages received from the personnel communication portion and transmits the personnel messages as uplink messages above ground through the uplink portion;
sending uplink messages as a frequency or tone from the controller through the uplink portion below ground in the tunnel through earth to above ground, the controller in communication with the uplink portion;
sending messages from above ground through earth to the controller through the downlink portion below ground in the mine, the controller in communication with the downlink portion;
sending from the controller through the personnel communication portion wirelessly to the personnel downlink messages as personnel messages, the controller in communication with the personnel communication portion; and
receiving wirelessly by the controller from the miners below ground in the tunnel personnel messages.

15. The method as described in claim 14 including the steps of a processing unit of the controller taking downlink messages received from the downlink portion and transmitting the downlink messages as miner messages to the personnel, and taking personnel messages received from the personnel communication portion and transmitting the personnel messages as uplink messages above ground through the uplink portion.

16. The method as described in claim 15 including the steps of the controller providing uplink messages to the uplink portion through an uplink interface of the controller, providing downlink messages received from the downlink portion to the processing unit through a downlink interface of the controller, sending personnel messages to the personnel from the processing unit through a personnel communication interface of the controller; and
receiving personnel messages from the miners by the processing unit through the personnel communication portion.

17. The method of claim 16 including the step of the processing unit broadcasting out the downlink messages as miner messages to all personnel through the personnel communication portion.

18. The method of claim 17 wherein the personnel communication portion includes a personnel communicator disposed with each personnel and including the step of sending from the personnel communicators a response to each personnel message received from the controller back to the controller through the personnel communication portion.

19. The method of claim 18 wherein the response is either positive or negative, and including the steps of the processing unit counting the responses that are positive which were received over a predetermined time period and sending an uplink message at a frequency which corresponds to a number of responses counted in the predetermined time that are positive which were receives by the controller.

20. The method of claim 19 wherein positive responses are green responses and negative responses are red responses.

21. The method of claim 20 including the step of preventing electrical feedback from a battery to external tunnel power with a relay bank of the controller.

* * * * *